United States Patent [19]

Abe et al.

[11] Patent Number: 4,745,674
[45] Date of Patent: May 24, 1988

[54] TOOL HOLDER IN MACHINING CENTER

[75] Inventors: Hitoshi Abe; Akira Kobayashi, both of Utsunomiya, Japan

[73] Assignee: Kyoritsu Seiki Corporation, Tochigi, Japan

[21] Appl. No.: 757,978

[22] Filed: Jul. 23, 1985

[30] Foreign Application Priority Data

Jul. 28, 1984 [JP] Japan ................. 59-158336

[51] Int. Cl.⁴ .................. B23C 5/26; B23Q 3/155
[52] U.S. Cl. .......................... 29/568; 279/4; 279/75; 408/239 R; 409/232
[58] Field of Search ............ 279/1 A, 1 E, 4, 75; 408/239 R, 239 A; 409/232, 234; 29/568

[56] References Cited

U.S. PATENT DOCUMENTS

| | | | |
|---|---|---|---|
| 3,364,800 | 1/1968 | Benjamin et al. | 408/239 R |
| 3,369,820 | 2/1968 | Lehmkuhl et al. | 279/4 |
| 3,396,981 | 8/1968 | Hammond | 408/239 R X |
| 3,586,343 | 6/1971 | Reed | 409/232 X |
| 3,709,623 | 1/1973 | Stephan et al. | 408/22 |
| 3,735,993 | 5/1973 | Seibert | 279/75 |
| 3,788,658 | 1/1974 | Benjamin et al. | 279/75 |
| 3,985,368 | 10/1976 | Better et al. | 279/75 |
| 4,298,208 | 11/1981 | Benjamin et al. | 279/1 E X |
| 4,505,020 | 3/1985 | Kinoshita | 29/568 |
| 4,546,533 | 10/1985 | Hallbach et al. | 29/568 |
| 4,547,955 | 10/1985 | Shiomi et al. | 29/568 |
| 4,560,310 | 12/1985 | Eckstein et al. | 409/233 |
| 4,673,319 | 6/1987 | Ishikawa | 409/234 |

Primary Examiner—Z. R. Bilinsky
Attorney, Agent, or Firm—Armstrong, Nikaido, Marmelstein & Kubovcik

[57] ABSTRACT

A tool holder in a machining center comprising a basic tool holder provided with a tapered fitting hole formed on the nose portion and a small tool having its tapered fitting portion fitted detachably in the tapered fitting hole, wherein a plurality of guide holes for protruding a locking ball are formed on a circumferential wall of the fitting hole, a recess for receiving the locking ball therein is provided on a nose outer peripheral surface of the basic tool holder on which the fitting hole is formed, and a piston actuated at all times toward a base end portion of the basic tool holder is provided slidably and wherein release means for releasing the small tool from being locked by shifting the piston toward a nose of the basic tool holder is provided between the piston and the basic tool holder, a pressure chamber is formed further between the piston and the basic tool holder, and a high-pressure air from a fluid pressure source is connected to each discharge port in the pressure chamber and the fitting hole through a fluid circuit provided with a directional control valve.

5 Claims, 3 Drawing Sheets

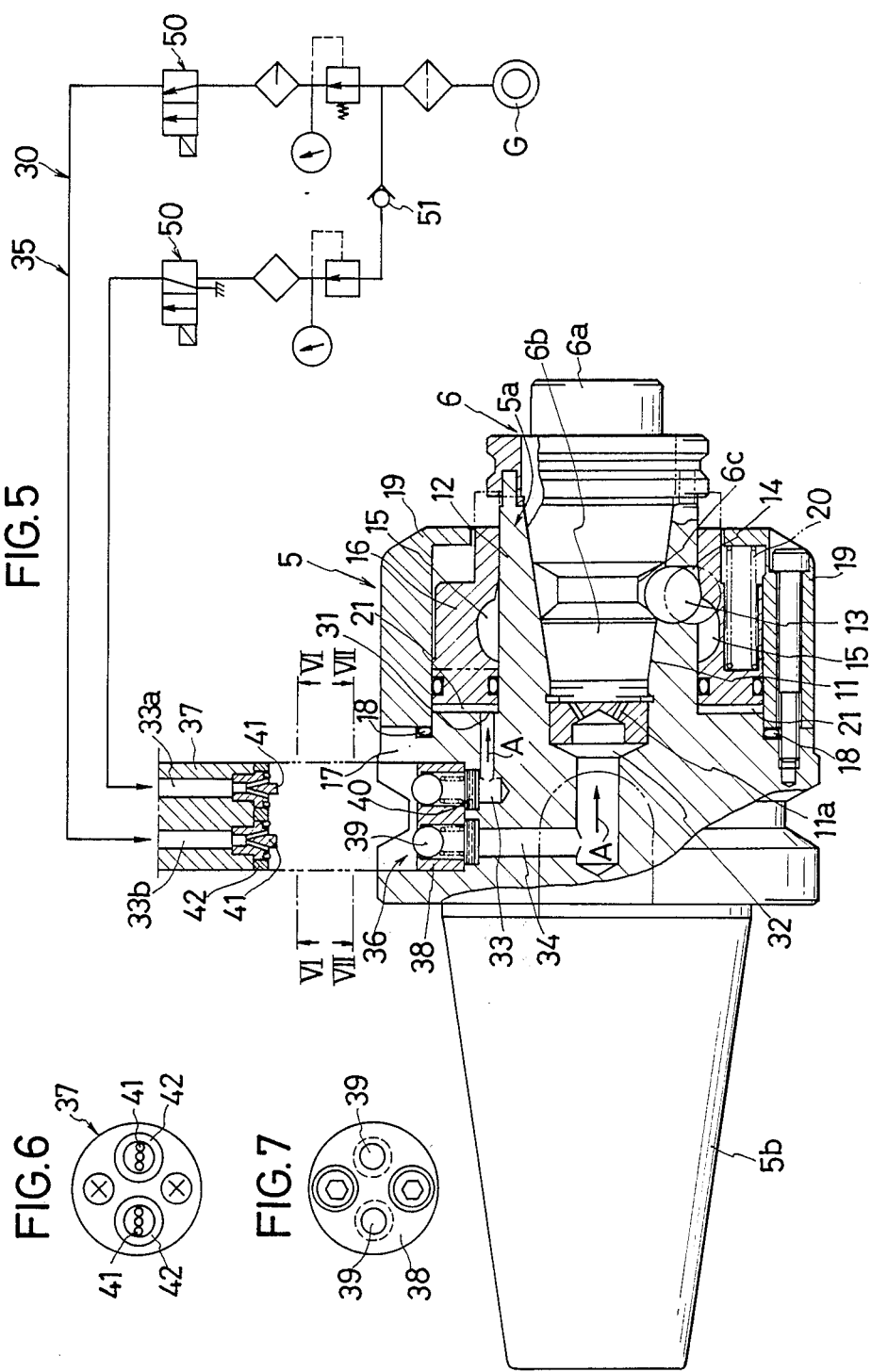

TOOL HOLDER IN MACHINING CENTER

BACKGROUND OF THE INVENTION

This invention relates to a tool holder in a machining center, and more particularly, a tool holder in a machining center by which small tools can be interchangeably mounted on a basic tool holder.

It has of late been increasingly demanded that with a use of a single machining center, different works should be effectively processed and/or a multi-stage processing should be possibly perfomed. To meet this demand, it is proposed to have a tool magazine of the machining center with a wide variety of tools.

The kind of tools generally used in such machining center a drill used for about 40% of the processing, a small diameter end mill for about 15% of the processing, a tap for about 20% of the processing, and a large-sized cutting tool for roughing works for about 25% of the remainder of the processing.

About 75% of the tools installed on a large spindle of the machining center are small-sized tools for cutting.

With conventional tool magazines in machining centers, the number of tools that can be accommodate is limited. It is often infeasible to machine all of a variety of works by a single setting of tools. It is conceivable to enlarge the tool magazine so as to increase the number of tools to be therein stored. However, there still remains problems in the space requirement of the entire machine and economical reasons.

Consequently, where a machining cannot be finished by a single setting of tools on the conventional machining center, one must have the machine redriven, whereby the machining efficiency is adversely affected.

In the machining center where small tools are prevailingly utilized, there has not been proposed a tool holding arrangement or device in which changing of small tools and ordinary tools can be performed automatically and efficiently.

SUMMARY OF THE INVENTION

A first object of the present invention is to provide a tool holder in a machining center, with or by which small tools stored in a tool magazine can be replaced efficiently in a basic tool holder installed on a spindle of the machining center.

A second object of the invention is to provide a tool holder in a machining center, with or by which small tools can be interchanged efficiently and a fitting portion of the basic tool holder can be kept clean at all times, thereby fitting small tools therein can be securely made.

A third object of the invention is to provide a tool holder in a machining center, in or with which the tool magazine is compactly made and the space necessary for installing the machine is minimized.

A foruth object of the invention is to provide a tool holder in a machining center, which is provided with a tool storing portion in which to store small tools on a circumferential side wall of a pallet, whereby the number of tools can be greatly increased in addition to the number of tools received in the tool magazine.

BRIEF DESCRIPTION OF THE DRAWINGS

FIG. 5 is a sectional view of a basic tool holder;

FIG. 6 is a plan view taken on line VI—VI of FIG. 5;

FIG. 7 is a plan view taken on line VII—VII of FIG. 5; and

DETAILED DESCRIPTION OF THE INVENTION

The present invention will now be described in connection with embodiments thereof, in conjunction with the accompanying drawings.

Figure 4:
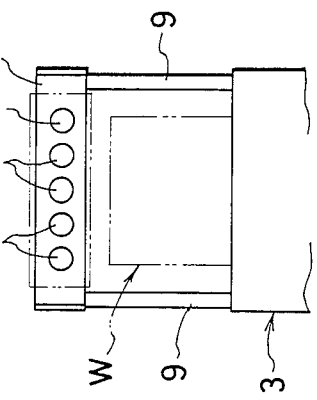
FIG. 4 is a side view representing another example of the pallet.
Figure 1:
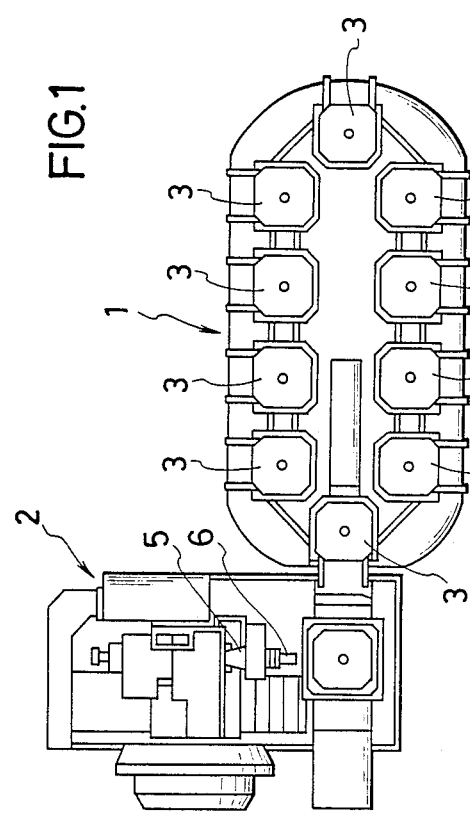
FIG. 1 is a plan view of a machining center provided with a pallet pool line, in which a tool holder embodying the present invention is incorporated.
Figure 3:
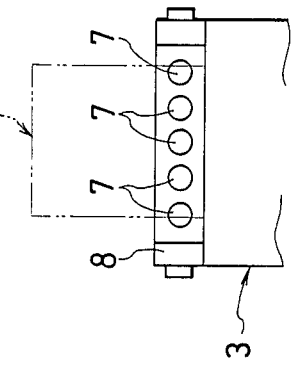
FIG. 3 is a side view of FIG. 2.
Figure 2:
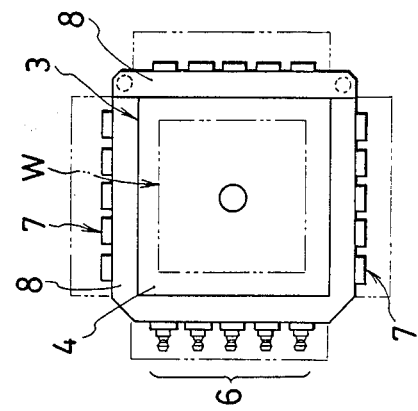
FIG. 2 is an enlarged plan view of a pallet.

FIG. 1 is a plan view of a machining center 2 having a pallet pool line 1, in which a tool holder of the invention is incorporated. As shown in FIG. 2 and FIG. 3, a plurality of tool storing portions 7 (tool receiving holes) for storing small tools 6 to be mounted on a basic tool holder 5 are formed at predetermined intervals on a circumferential side wall 4 of a plurality of pallets 3 (pallet tables on which a work W is placed) disposed on the pallet pool line 1. The storing portions 7 can be formed directly on the pallet 3, or a separate member 8 having enclosing portions 7 or further, as shown in FIG. 4, a housing bed 10 for small tools 6 having storing portions 7 can be formed on the pallet 3 through a guide member 9.

Small tools 6, for example ones suitable for machining a work W set on the pallet 3, may be preparatively stored in portions 7 and the housing bed 10, whereby the machining can be facilitated. Accordingly, if a plurality of tool storing portions 7 and housing beds 10 for small tools 6 are provided each on a plurality of pallets 3 disposed on the pallet pool line 1, then the number of tools normally can be greatly increased in addition to the number of tools stored in the tool magazine.

Figure 8:
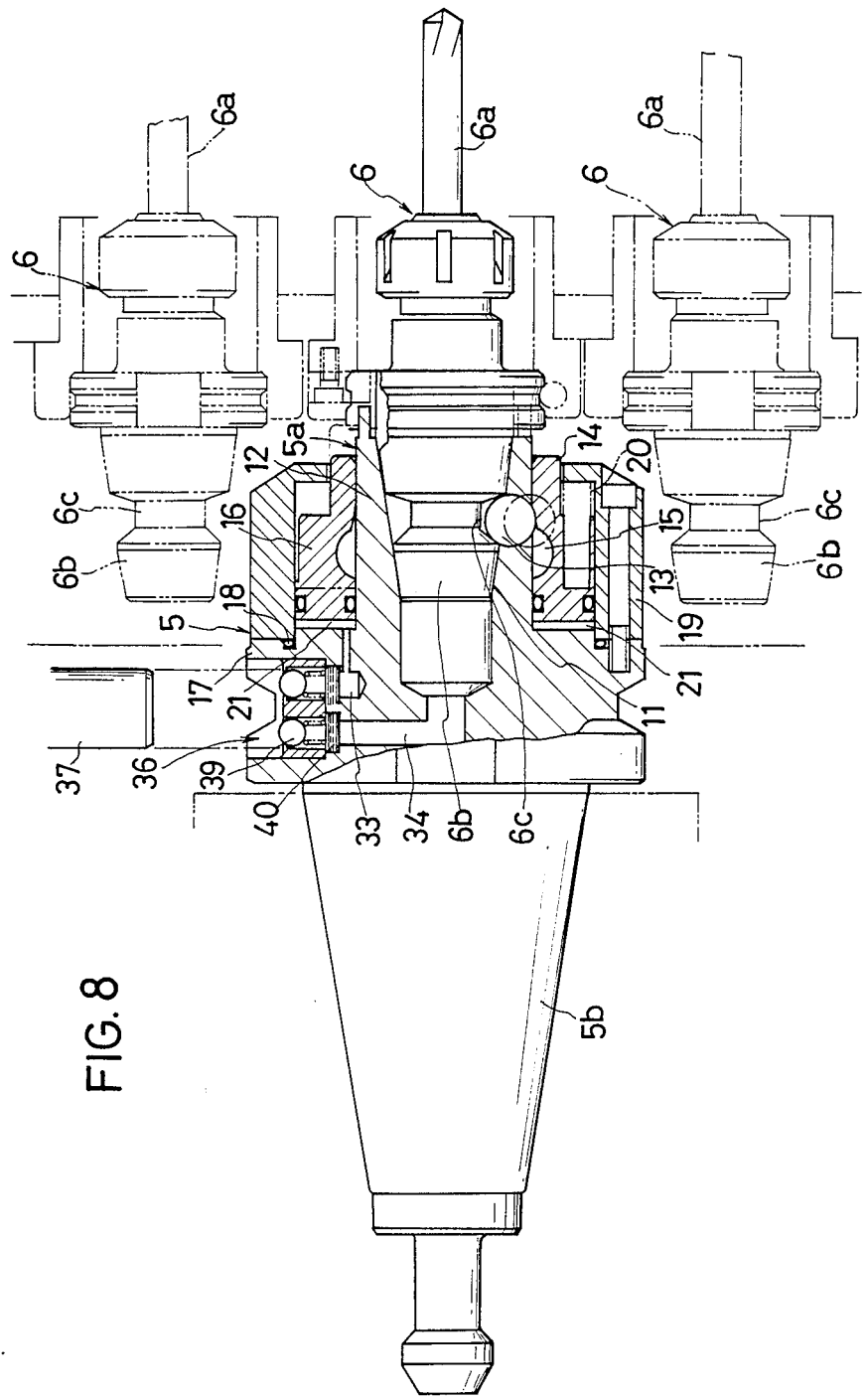
FIG. 8 is a sectional view of the basic tool holder, taken to illustrate the manner of replacing or interchanging small tools.

As shown in FIG. 8, the small tool 6 has a cutting tool part 6a formed on the nose and an engaging recess 6c formed on a fitting portion 6b of the rear end side.

Then, housing of small tools 6 is not necessarily limited to the above-described example, and an exclusive storing portion for small tools 6 can be provided, for example, on a part or externally of the machining center 2 separately from a conventional tool magazine. As a construction of the basic tool holder 5, there is formed a tapered fitting hole 11 in which to fit the fitting portion 6b of the small tool 6 detachably on a nose portion 5a of the basic tool holder 5, as shown in FIG. 5 and FIG. 7.

A plurality of guide holes 14 for protruding a plurality (3 pieces in the embodiment) of locking balls 13 are formed on a circumferential wall 12 of the fitting hole 11.

A recess 15 for receiving the locking balls 13 therein is provided on a nose outer peripheral surface of the basic tool holder 5 in which the fitting hole 11 is formed. A piston 16 actuated at all times to a base end portion 5b of the basic tool holder 5 is inserted slidably therein. The piston 16 is retained slidably by a cover member 19 installed on a flange 17 of the basic tool holder 5 through a sealing member 18, and a plurality of springs 20 for actuating the piston 16 are provided between a nose of the cover member 19 and a nose of the piston 16.

A pressure chamber 21 is formed between the piston 16 and the flange 17 of the basic tool holder 5. Release means 30 for releasing the small tool 6 from being locked by shifting the piston 16 toward the nose portion 5a of the basic tool holder 5 is connected to pressure chamber 21.

The release means 30 operates to shift the piston 16 toward the nose portion 5a of the basic tool holder 5 with high-pressure air A discharged into the pressure chamber 21 and the fitting hole 11 from a fluid pressure source G, to release the small tool 6 from the basic tool holder 5, and clean the inside wall of the fitting hole 11. The pressure of high-pressure air A should preferably be about double the pressure of the spring 20 to activate the piston 16.

Referring further in detail to a construction of the release means 30, a discharge port 31 communicating with the pressure chamber 21 and a discharge port 32 communicating with the tapered fitting hole 11 are formed within the basic tool holder 5. A connection 36 of a fluid circuit 35, communicating with the fluid pressure source G, is formed on opening end portions of passages 33 and 34 for the high-pressure air A which communicate with the discharge ports 31 and 32.

A valve body 38 connected with a joint 37 on a side of the fluid circuit 35 is installed on the connection 36, and a check ball 39 and a filter 40 are provided on the valve body 38.

Passages 33a and 33b on joint 37 for the high-pressure air A are connected to the discharge ports 31 and 32. A nozzle 41 fitted detachably in the connection 36 is installed thereon through a cover 42. The nozzle 41 depresses the check ball 39 when the joint 37 is installed on the connection 36, thereby discharging the high-pressure air A into the pressure chamber 21 and a nozzle 11a in the fitting hole 11. The high-pressure air discharged in the pressure chamber 21 releases the small tool 6 locked in fitting hole 11 by shifting the piston 16 rightward of FIG. 5. The high-pressure air A discharged in the fitting hole 11 removes chip, dust and the likes from inside the fitting hole 11.

A directional control valve 50 for transferring a supply of high-pressure air A to the pressure chamber 21 and the fitting hole 11. A check valve 51 are provided midway of the fluid circuit 35, and is effective for preventing high-pressure air A from dropping in pressure when transfer of the high-pressure air A, operation of the piston 16 and removal of chip, dust and others are synchronized.

Next, the operation will be described.

As shown in FIG. 8, the small tool 6, accommodated in the tool magazine, or the like, is installed on the basic tool holder 5 mounted the spindle of the machining center 2. Fitting hole 11 of the basic tool holder 5 is fitted and pushed onto fitting portion 6a of the small tool 6 projecting from the tool storing portion 7, FIGS. 2–4. The locking ball 13, protruding from the circumferential wall 12 of the fitting hole 11, is pushed into the recess 15 of the piston 16 by the fitting portion 6b of the small tool 6.

When a force pushing outward from the guide 14 works on the ball 13, the piston 16 is pushed toward the base end portion 5b of the basic tool holder 5 against the spring force of the spring 20 and the ball once enters the recess 15 of the piston 16. Then, when the fitting portion 6b of the small tool 6 passes the locking ball 13 and the engaging recess 6c comes to a position of the guide hole 14, the ball 13 protrudes again from the guide hole 14 to engage in the recess 6c according to the piston 16 pushed toward the base end portion 5b of the basic tool holder 5 on the force of the spring 20, the small tool 6 is locked thereby. The ball 13 is fixed by an inside wall surface of the piston 16.

Next, in case the small tool 6 is released from being locked, first the joint 37 on the side of the fluid circuit 35 is connected to the connection 36 of the basic tool holder 5. The directional control valve 50 provided on the fluid circuit 35 is transferred to the side of pressure chamber 21.

When the high-pressure air A is introduced to the pressure chamber 21 from the fluid pressure source G through the fluid circuit 35, the piston 16 shifts toward the nose portion 5a of the basic tool holder 5 against the force of the spring 20. When the recess 15 of the piston 16 shifts as far as a position of the guide hole 14, the locking ball 13 comes out of the recess 6c to release the small tool 6 from being locked. The flange of the small tool 6 is then pushed out by the nose of the piston 16, therefore the small tool 6 can be easily pulled out of the fitting hole 11 of the basic tool holder 5.

Thus the small tool 6 is released from the locked state by a double release means. If a tapered part of the small tool 6 is fitted tightly in the fitting hole 11 at the time of, for example, a stack cutting on an end mill or the like, it can be easily pulled out as described.

Then, from transferring the directional control valve 50 provided on the fluid circuit 35 to the side of fitting hole 11 after the small tool 6 is pulled out of the basic tool holder 5, the high-pressure air A is then discharged into the fitting hole 11, and chip, dust and others present inside the fitting hole 11 can be removed externally of the basic tool holder 5.

This invention comprises a basic tool holder provided with a fitting hole for fitting a small tool detachably in the nose portion as described, wherein a plurality of guide holes for protruding a locking ball are formed on a circumferential wall of the fitting hole, a recess for receiving the locking ball therein is provided on a nose outer peripheral surface of the basic tool holder with the fitting hole formed therein as described, a piston actuated at all times toward a base end portion of the basic tool holder is provided slidably, and release means for releasing the small tool from being locked by shifting the piston toward a nose of the basic tool holder is provided between the piston and the basic tool holder, therefore in a machining center having a tool magazine for small tools, the small tools stored in the tool magazine can be replaced efficiently to the basic tool holder installed on a spindle, and thus the time for replacing tools can be shortened effectively.

In another aspect, the invention comprises a basic tool holder provided with a fitting hole for fitting a small tool detachably in the nose portion, wherein a plurality of guide holes for protruding a locking ball are formed on a circumferential wall of the fitting hole, a recess for receiving the locking ball therein is provided on a nose outer peripheral surface of the basic tool holder with the fitting hole formed therein as described, a piston actuated at all times toward a base end portion of the basic tool holder is provided slidably, a pressure chamber is formed between the piston and the basic tool holder, and since a high-pressure air from a fluid pressure source is connected to each discharge port in the pressure chamber and the fitting hole through a fluid circuit provided with a directional control valve, the small tool can be replaced efficiently and a fitting portion of the basic tool holder can also be kept clean, thereby fitting of the small tool can be securely and effectively made.

Further, the construction is so simple that the tool holder can be fabricated at a moderate cost and easily maintained.

What is claimed is:

1. A tool holder for use in machining center, said tool holder having a cylindrical outer surface, a conical receiving base at its nose end and a base end portion at its opposite end, a tool having a conical shaft for engagement in said conical receiving base, a plurality of spaced guide holes in the circumferential wall of said conical receiving base, each of said holes having a locking ball therein for movement therethrough, the length of said holes being shorter then the diameter of said locking balls so that said locking balls project from said holes inwardly into said conical receiving base or outwardly from the opposite end of said holes and the outer cylindrical wall of said tool holder, a piston on said cylindrical wall and slidable thereon, means for urging said piston toward the end of said base end portion of said tool holder for locking said tool in said base, a pressure chamber between the base end of said tool holder and said piston, a high-pressure air source connected to said chamber and to the inner end of said conical receiving base and a directional control valve in said air source connection to said chamber, said piston having a plurality of locking ball receiving openings for receiving said locking balls in said holes in said conical receiving base when said piston is advanced by air pressure in said pressure chamber toward said nose end of said tool holder for unlocking and removing said tool from said base, said conical shaft of said tool having a recess for receiving said locking balls to lock said tool in said tool holder when said conical shaft of said tool is in said conical receiving base, said recess is aligned with said holes and said piston is urged by said urging means toward said end of said base end portion of said tool holder, said tool being unlocked for removal when said high pressure air from said air source is connected by said directional control valve to said air pressure chamber between said base end of said tool and said piston, said high pressure air connected to said inner end of said conical receiving base by said direction control valve removing any chips and dust deposited in said inner end of said base.

2. A tool holder as claimed in claim 1, wherein said tool has a flange portion pushed by the nose of said piston when said piston is advanced and releases said tool.

3. A tool holder in a machining center, as recited in claim 1, characterized in that a plurality of tool storing portions for small tools to be mounted on said tool holder are formed at predetermined intervals on a plurality of pallets displosed on a pallet pool line adjacent to and aligned with said tool holder.

4. A tool holder as claimed in claim 3, wherein a plurality of tool storing portions for small tools to be mounted on the tool holder are formed at predetermined intervals on a circumferential side wall portion of said pallet.

5. A tool holder as claimed in claim 3, wherein a small tool housing bed provided with tool storing portions is formed on said pallet through a guide member.

* * * * *